(12) United States Patent
Vaishnav et al.

(10) Patent No.: US 10,839,106 B2
(45) Date of Patent: Nov. 17, 2020

(54) CREATING WORKFLOW INSTANCES

(71) Applicant: Microsoft Technology Licensing, LLC, Redmond, WA (US)

(72) Inventors: Sunay Vaishnav, Seattle, WA (US); Charles William Lamanna, Bellevue, WA (US); Kartik Rao Polepalli, Bellevue, WA (US); Stephen Christopher Siciliano, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 15/785,818

(22) Filed: Oct. 17, 2017

(65) Prior Publication Data

US 2019/0005256 A1 Jan. 3, 2019

Related U.S. Application Data

(60) Provisional application No. 62/527,917, filed on Jun. 30, 2017.

(51) Int. Cl.
*G06Q 10/10* (2012.01)
*G06F 21/62* (2013.01)
(Continued)

(52) U.S. Cl.
CPC ............ *G06F 21/629* (2013.01); *G06F 9/468* (2013.01); *G06F 21/335* (2013.01);
(Continued)

(58) Field of Classification Search
CPC .. G06Q 10/06; G06Q 10/0633; G06Q 10/103; Y04S 10/54; G06F 21/604;
(Continued)

(56) References Cited

U.S. PATENT DOCUMENTS 7,729,935 B2  6/2010  Theiler
8,175,907 B2  5/2012  Robinson et al.
(Continued)

FOREIGN PATENT DOCUMENTS

EP   2973185 A2   1/2016
WO  2001059626 A1  8/2001

OTHER PUBLICATIONS

Stackoverflow (2013). Run workflow with specified user's id in sharepoint [closed]. Retrieved Mar. 2, 2020 from http://stackoverflow.com (Year: 2013).*

(Continued)

*Primary Examiner* — Brian F Shaw
(74) *Attorney, Agent, or Firm* — Fiala & Weaver P.L.L.C.

(57) ABSTRACT

Aspects extend to methods, systems, and computer program products for creating workflow instances. Workflow templates define different functionalities, such as, for example, between fixed and variable functionality or between functionality authored by different co-authors. Different functionalities defined in a workflow template can be configured to interoperate to provide workflow instances. Functionality defined within a workflow template can be instantiated in a workflow instance based on properties corresponding to the functionality. The properties can include connections with credentials for accessing resources used by the functionality. Connections can obscure access to credentials so that processes outside of a workflow instance cannot use the credentials to access resources.

20 Claims, 11 Drawing Sheets

(51) Int. Cl.
  *G06F 9/46* (2006.01)
  *G06F 21/60* (2013.01)
  *G06Q 10/06* (2012.01)
  *G06F 21/33* (2013.01)

(52) U.S. Cl.
  CPC ........ *G06F 21/604* (2013.01); *G06F 21/6209* (2013.01); *G06F 21/6218* (2013.01); *G06Q 10/06* (2013.01); *G06Q 10/103* (2013.01)

(58) Field of Classification Search
  CPC ................. G06F 21/45; G06F 21/6227; G06F 2221/2141; G06F 3/0484; G06F 11/3438; H04L 41/0843; H04L 63/0227; H04L 63/0263; H04L 63/105; H04L 63/20
  See application file for complete search history.

(56) References Cited

U.S. PATENT DOCUMENTS

| | | |
|---|---|---|
| 8,645,180 B1 | 2/2014 | Zeng |
| 2008/0301684 A1 | 12/2008 | Barros et al. |
| 2011/0246527 A1* | 10/2011 | Bitting ................. G06F 21/604 707/784 |
| 2014/0207927 A1 | 7/2014 | Fichtenholtz et al. |
| 2014/0279569 A1 | 9/2014 | Baldwin et al. |
| 2016/0004731 A1 | 1/2016 | Sivasubramanian et al. |
| 2016/0063145 A1 | 3/2016 | Chang et al. |
| 2017/0039520 A1 | 2/2017 | Trump et al. |

OTHER PUBLICATIONS

Hussain, et al., "A Security-oriented Workflow Framework for Collaborative Environments", In Proceedings of 15th IEEE International Conference on Trust, Security, and Privacy in Computing and Communications, Aug. 23, 2016, pp. 707-714.

"International Search Report and Written Opinion Issued in PCT Application No. PCT/US2018/035250", dated Sep. 19, 2018, 13 Pages.

Siciliano, Stephen, "Announcing the Preview of Team Flows", Retrieved From: https://web.archive.org/web/20170420093145/https://flow.microsoft.com/en-us/blog/team-flows/, Feb. 6, 2017, 4 Pages.

\* cited by examiner

CREATING WORKFLOW INSTANCES

CROSS-REFERENCE TO RELATED APPLICATIONS

This application claims the benefit of and priority to U.S. Provisional Patent Application Ser. No. 62/527,917 entitled "COLLABORATING ON WORKFLOWS WITH LINKED ACCESS TO CREDENTIALS", filed Jun. 30, 2017 by Sunay Vaishnav et al., the entire contents of which are expressly incorporated by reference.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

Workflows typically require a set of credentials to connect to various services and execute actions against these services. In some environments, a workflow is authored by Information Technology (IT) personnel and distributed out to end users. IT personnel can use service account credentials to configure workflows to run in the context of a service account. The service account can have rights to access any resources utilized by the workflow. However, a service account is also typically a super user, an administrator, or other highly privileged user account with unfettered access to potentially all resources within a system. Thus, although a workflow can be designated for use with specific resources, the work flow has privileges to access virtually any resources in the system. An end user with access to the workflow can modify the workflow to perform malicious activities within the system in the context of the service account (and thus with increased privileges).

In other environments, a workflow is shared collaboratively among a number of users. Different pieces of the workflow may require different user credentials to access different resources. To improve collaboration, each user may need to have access to credentials for a number (or even all) of the other users. As such, users can share credentials with one another. However, sharing credentials is insecure and may lead to malicious activities, even among a group of collaborating users that trust one another.

Once a user has access to another user's credentials and/or can perform activities in the context of the other user, it can be difficult to revoke access. For example, credentials may need to be completely reset to revoke access.

On the other hand, if a user does not have access to necessary credentials from one or more other users or a super user, the user may not be able to use a workflow for its intended purpose.

BRIEF SUMMARY

Examples extend to methods, systems, and computer program products for creating workflow instances. A command to create an instance of a workflow is received. A workflow template is accessed. The workflow template defines first functionality and second functionality. The first functionality and the second functionality are defined to interoperate to provide managed workflow instances from the workflow template.

A first property and a second property are accessed. A workflow instance is created from the workflow template. The first functionality is instantiated in the workflow instance based on the first property. The second functionality is instantiated in the workflow instance based on the second property.

In one aspect, the first property is a connection including credentials authoring access to a resource and the first functionality is instantiated based on the resource. In another aspect, the first and second functionalities are defined to interoperate in created workflow instances. In a further aspect, the first functionality is fixed functionality and the second functionality is variable customizable functionality. In additional aspect, multiple co-authors collaborate to author a workflow template. Workflow instances created from the workflow template perform activities with the combined permissions of the multiple co-authors.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
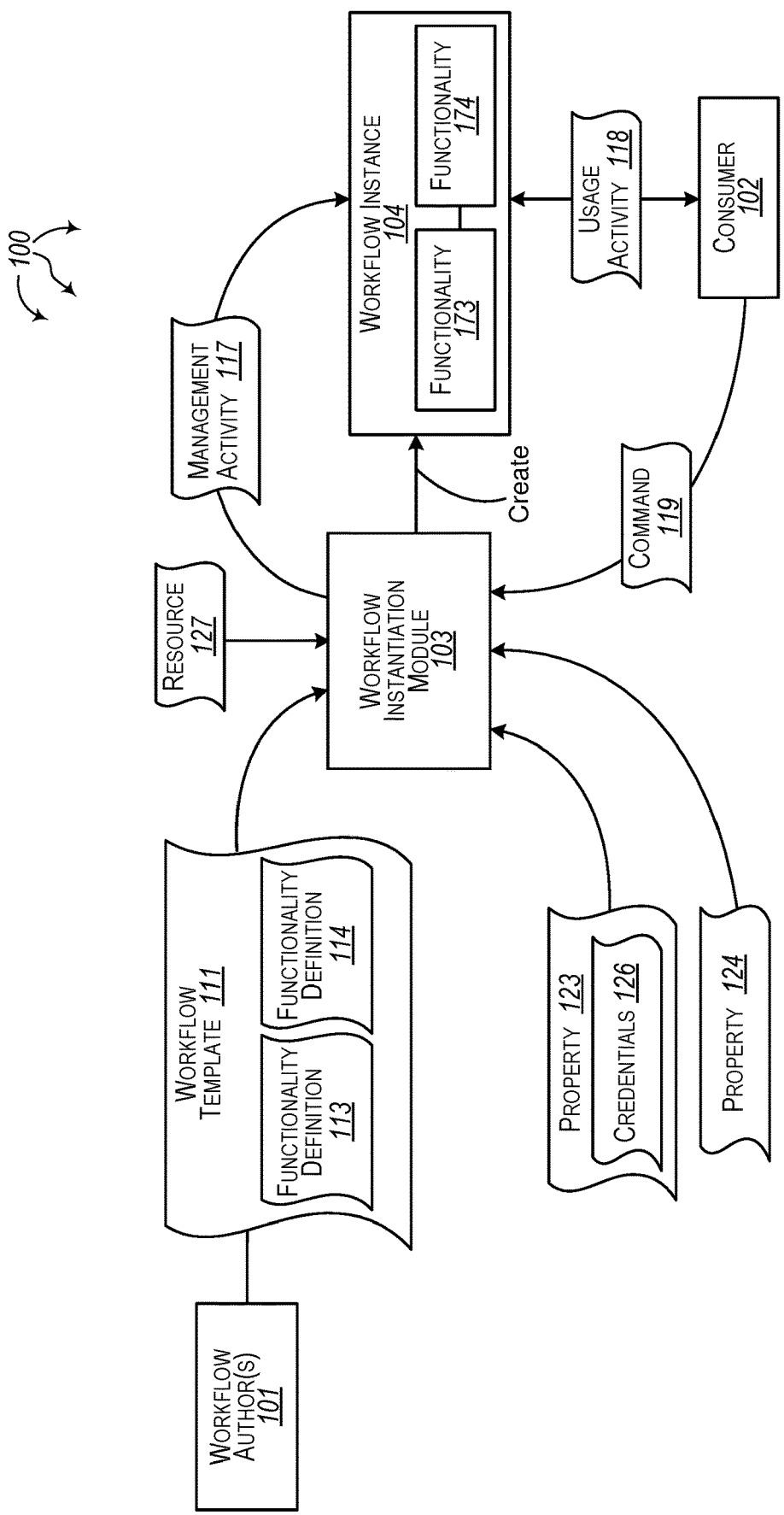
FIG. 1 illustrates an example computer architecture that facilitates instantiating workflow instances.

Examples extend to methods, systems, and computer program products for creating workflow instances. A command to create an instance of a workflow is received. A workflow template is accessed. The workflow template defines first functionality and second functionality. The first functionality and the second functionality are defined to interoperate to provide managed workflow instances from the workflow template.

A first property and a second property are accessed. A workflow instance is created from the workflow template. The first functionality is instantiated in the workflow instance based on the first property. The second functionality is instantiated in the workflow instance based on the second property.

In one aspect, a workflow template defines fixed functionality and variable functionality. The fixed functionality is virtually the same for any workflow instances created from the workflow template. The variable functionality scan be customized for each workflow instance created from the workflow template. A first and second property are accessed. The fixed functionality is instantiated in the workflow instance based on the first property. Instantiation of the variable functionality is customized in the workflow instance based on the second property.

In another aspect, a workflow template is co-authored by a first co-author and a second co-author. A workflow is created from the workflow template. The permissions for the workflow instance are the union of permissions associated with the first and second co-authors.

Aspects of the invention allow a workflow owner to give other users access to create workflow instances without having to share credentials. User credentials can be contained in a (e.g., encrypted) data element or "connection" that obscures the user credentials. Access Control List (ACL) enforcement can also be used to control access to and sharing of connections. A user (or author) can permit a workflow to use a connection including his or her credentials. Other co-users (or co-authors) can modify the workflow, but are prevented from modifying the user's (or author's) connection used by the workflow.

A user (or author) with collaborator access to a workflow, can use connections the workflow can access. However, the collaborator user (or author) can be prevented from using the connections in any other workflow or other applications. If the collaborator user (or author) loses access to the workflow, he or she also loses access to use the connection. As such, credentials can be more securely mixed and matched (through corresponding connections) at authoring time and invocation. Appropriate user credentials can be used, potentially eliminating any use of system level or application level credentials in workflows.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: data manipulation code, input instructions, data manipulation instructions, output instructions, input data, output data, detail settings, data workflow, input views, data manipulation views, output views, feedback, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, data manipulation code, input instructions, data manipulation instructions, output instructions, input data, output data, detail settings, data workflow, input views, data manipulation views, output views, feedback, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, "instantiating" is defined as creating an instance of an object from a definition for the object. Instantiating includes creating an instance of a workflow (or "workflow instance") from a workflow definition Instantiating also includes creating an instance of specified functionality defined in a workflow template within a workflow instance created from the workflow template.

Aspects permit a workflow owner to give other uses access to a workflow without having to share credentials that are being used in the workflow. Co-owners can modify the flow. However, co-owners can be prevented from modifying connection credentials being used by the workflow. Preventing modification of connection credentials facilitates a more rigorous security model for flow collaboration.

Workflow Instantiation

FIG. 1 illustrates an example computer architecture 100 that facilitates instantiating workflow instances. As depicted, computer architecture 100 includes workflow author(s) 101, consumer 102, workflow instantiation module 103, and workflow instance 104. Workflow author(s) 101, consumer 102, workflow instantiation module 103, and workflow instance 104 can be connected to (or be part of) a network, such as, for example, a system bus, a Local Area Network ("LAN"), a Wide Area Network ("WAN"), and even the Internet. Accordingly, workflow authors (s) 101, consumer 102, workflow instantiation module 103, and workflow instance 104 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, workflow authors(s) 101 (e.g., one or more workflow author(s)) can create workflow templates used to instantiate workflows. A workflow template can define different portions of (potentially interoperating) functionality. Each defined portion of functionality in a workflow template can be instantiated in a workflow instance based on and/or using corresponding properties.

Workflow instantiation module 103 is configured to access a workflow template and corresponding properties for different portions of functionality defined in the workflow template. Workflow instantiation module 103 can create a workflow instance (e.g., into system memory) from the workflow template. Workflow instantiation module 103 can use properties for each portion of defined functionality to instantiate the defined functionality in the created workflow instance. Workflow instantiation module 103 can send management activities to a created workflow instance to change the functionality of the workflow instance while the workflow instance is running.

Consumer 102 can interact with a workflow instance through usage activity, such as, for example, entering input into a workflow instance and receiving output from the workflow instance.

Figure 2:
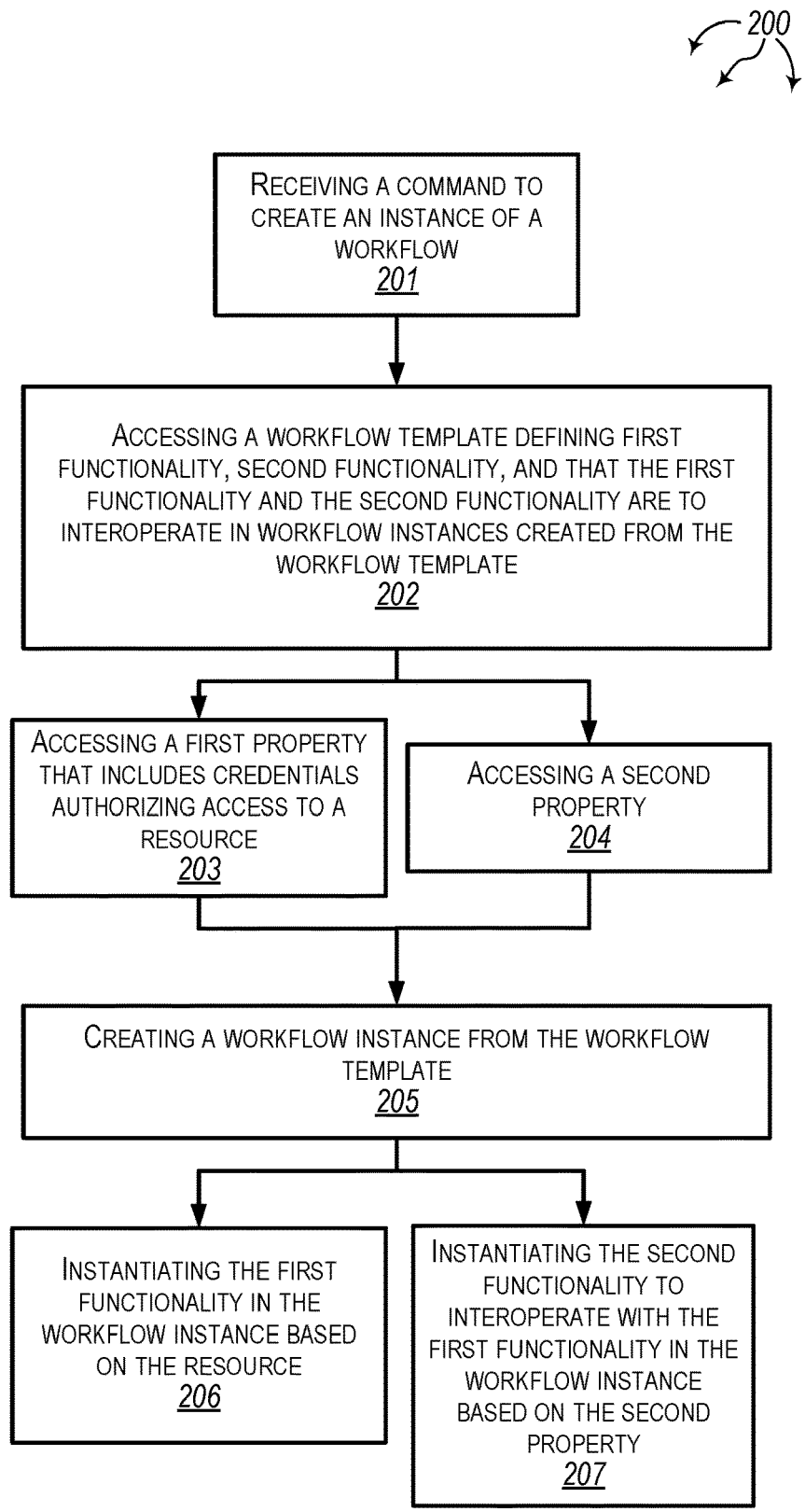
FIG. 2 illustrates a flow chart of an example method for instantiating workflow instances.

FIG. 2 illustrates a flow chart of an example method 200 for instantiating workflow instances. Method 200 will be described with respect to the components and data of computer architecture 100.

Consumer 102 can send command 119 to workflow instantiation module 103. Command 119 can be a command requesting creation of a workflow instance. Method 200 includes receiving a command to create an instance of a workflow (201). For example, workflow instantiation module 103 can receive command 119 from consumer 102.

Method 200 includes accessing a workflow template defining first functionality, second functionality, and that the first functionality and the second functionality are to interoperate in workflow instances created from the workflow template (202). For example, workflow instantiation module 103 can access workflow template 111. Workflow template 111 includes functionality definition 113 and functionality definition 114. Functionality definition 113 and functionality definition 114 define different portions of functionality that can interoperate to provide a managed workflow instance from workflow template 111.

Method 200 includes accessing a first property that includes credentials authorizing access to a resource (203). For example, workflow instantiation module 103 can access property 123 including credentials 126. Credentials 126 authorize access to resource 127 (e.g., a file directory, an inbox, etc.). Method 200 includes accessing a second property (204). For example, workflow instantiation module 103 can access property 124.

Method 200 includes creating a workflow instance from the workflow template (205). For example, workflow instantiation module 103 can create workflow instance 104 (e.g., in system memory) from workflow template 111. Method 200 includes instantiating the first functionality in the workflow instance based on the resource (206). For example, workflow instantiation module 103 can use credentials 126 to access resource 127. Workflow instantiation module 103 can instantiate functionality 173 in workflow instance 104 based on resource 127. Functionality 173 can be instantiated to implement functionality defined in functionality definition 113.

Method 200 includes instantiating the second functionality to interoperate with the first functionality in the workflow instance based on the second property (207). For example, workflow instantiation module 103 can instantiate functionality 174 to interoperate with functionality 173 in workflow instance 104 based on property 124. Functionality 174 can be instantiated to implement functionality defined in functionality definition 114.

After workflow instance 104 is created, consumer 102 (e.g., a person) can exchange usage activity 118 with (e.g., input to and/or output from) workflow instance 104 to perform a specified function (e.g., multiple numbers, view a notification, access a file, etc.). Also after workflow instance 104 is created and while workflow instance 104 is running, workflow instantiation module 103 can send management activities 117 to workflow instance 104 to change how workflow instance 104 functions (e.g., changing one or more of functionalities 173 and 174). As such, the functionality of workflow instance 104 can be changed (e.g., updated, versioned, etc.) without having to re-create workflow instance 104.

Customized Workflow Instantiation

Figure 3:
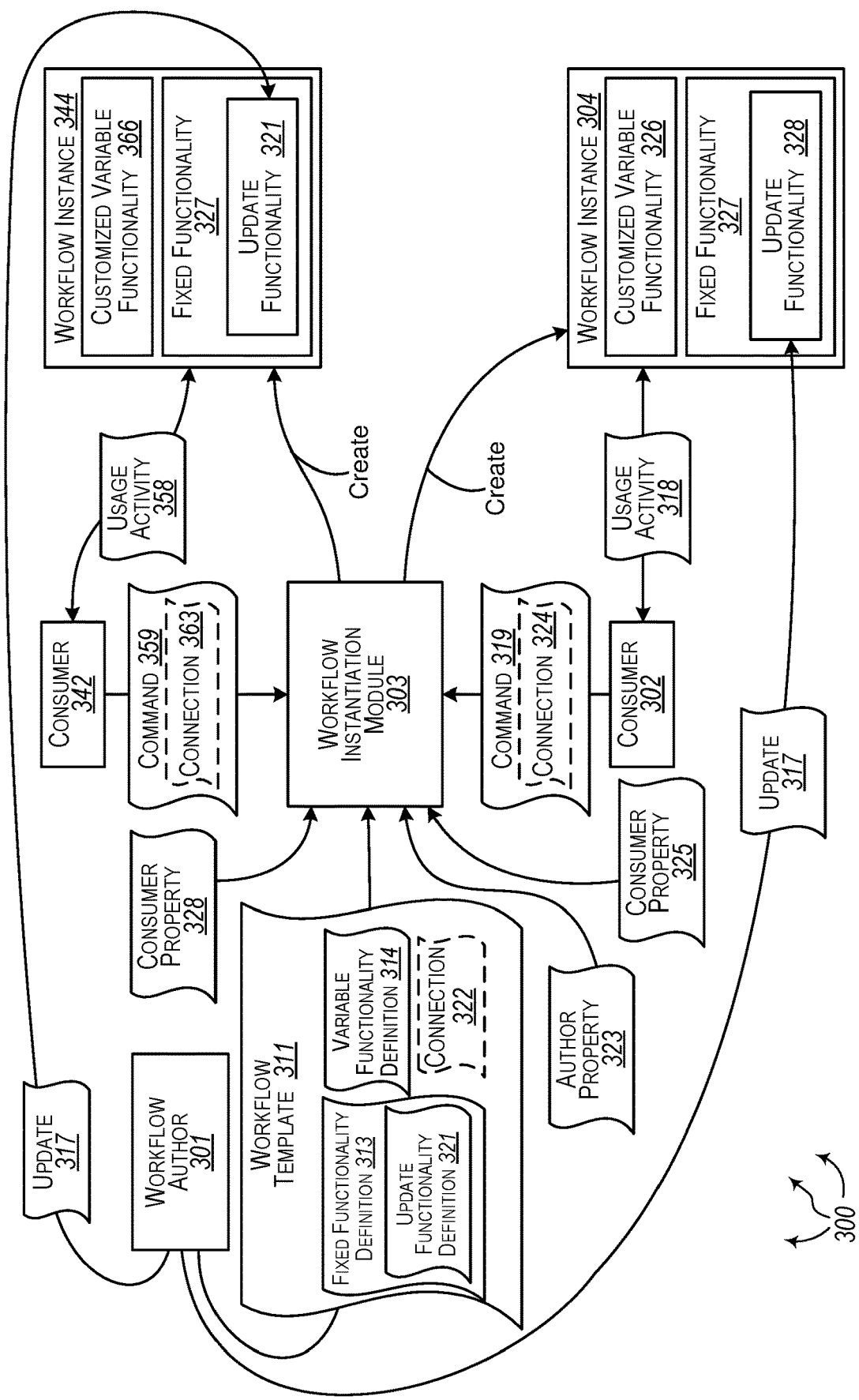
FIG. 3 illustrates an example computer architecture that facilitates instantiating customizable workflow instances.

FIG. 3 illustrates an example computer architecture 300 that facilitates instantiating customizable workflow instances. As depicted, computer architecture 300 includes workflow author 301, consumer 302, consumer 342, workflow instantiation module 303, workflow instance 304, and workflow instance 344. Workflow author 301, consumer 302, consumer 342, workflow instantiation module 303, workflow instance 304, and workflow instance 344 can be connected to (or be part of) a network, such as, for example, a system bus, a Local Area Network ("LAN"), a Wide Area Network ("WAN"), and even the Internet. Accordingly, workflow author 301, consumer 302, consumer 342, workflow instantiation module 303, workflow instance 304, and workflow instance 344 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Workflow author 301 (e.g., a human workflow author) can author workflow template 311 used to create customized workflows. Workflow template 311 includes fixed functionality definition 313 and variable functionality definition 314. Fixed functionality definition defines 313 functionality that is fixed (i.e., is virtually the same) for any workflow instances created from workflow template 311. Variable functionality definition 314 defines functionality that is customizable and that can vary between different workflow instances created from workflow template 311.

Workflow author 301 can formulate or otherwise be associated with author property 323 (i.e., author property 323 can be an "author" property). Author property 323 can be used to instantiate the fixed functionality in workflow instances. In one aspect, author property 323 is accessible without restriction. In another aspect, author property 323 is accessible using credentials of workflow author 301. In one aspect, the credentials are included in author property 323. In another aspect, the credentials are included in connection 322. Connection 322 obscures the credentials and limits use of the credentials to workflows instantiated from workflow template 311. In a further aspect, author property 323 is connection 322.

Workflow instantiation module 303 is configured to access workflow template 311, author property 323 and a consumer property a consumer. Workflow instantiation module 303 can create a customized workflow instance (e.g., in system memory). Workflow instantiation module 303 can use credentials in by using author property 323 (or connection 322) to access a resource associated with workflow author 301. Workflow instantiation module 303 can instantiate the fixed functionality (including update functionality defined in update functionality definition 321) in the customized workflow based on the resource. Workflow instantiation module 303 can also customize instantiation of the variable functionality based on a consumer property. Workflow author 301 can send management activities to instantiated update functionality to change the functionality of a running workflow instance.

Consumers 302 and 342 (e.g., people) can interact with workflow instances through usage activity, such as, for example, entering input into workflow instance and receiving output from the workflow instance.

Figure 4:
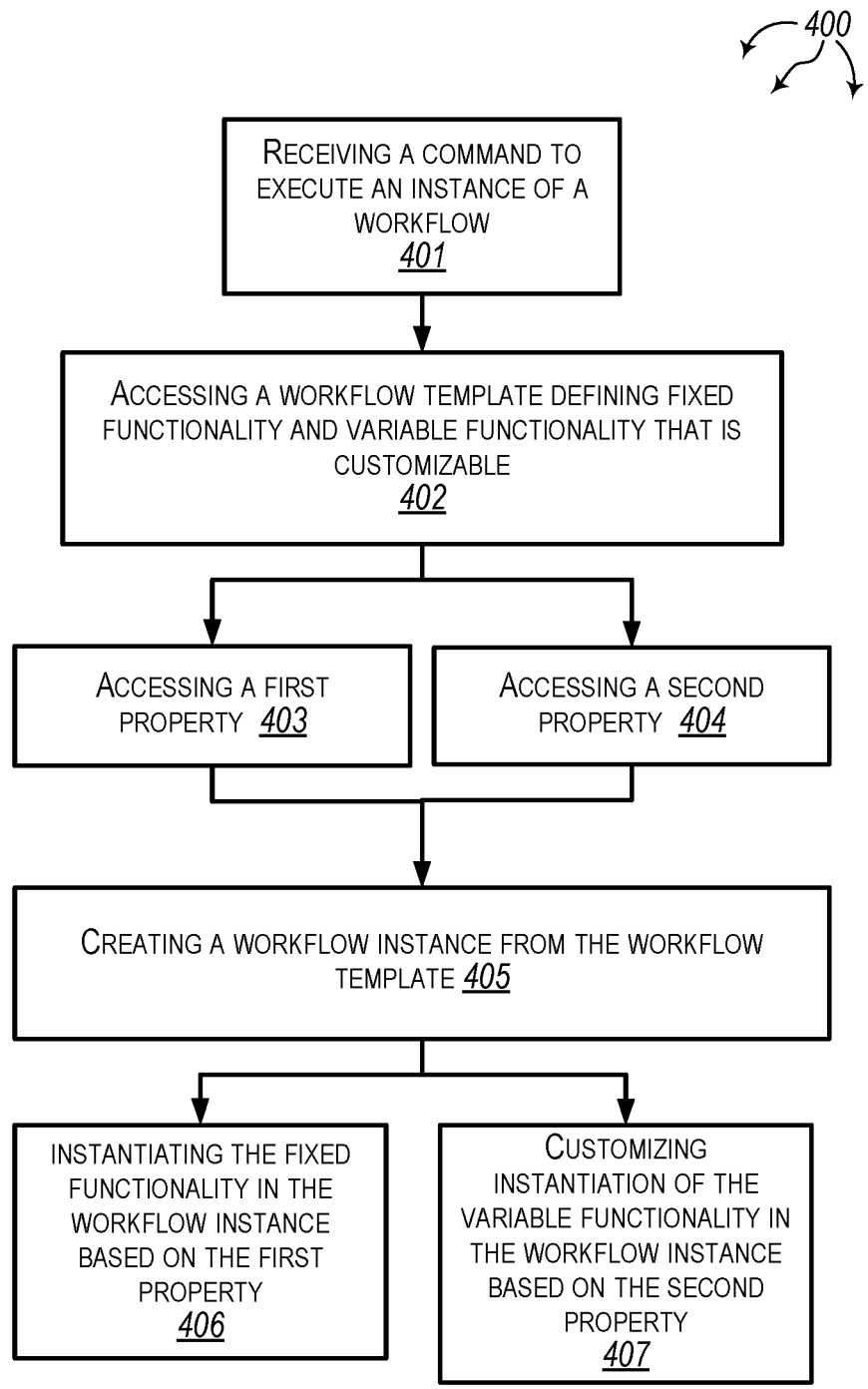
FIG. 4 illustrates a flow chart of an example method for instantiating customizable workflow instances.

FIG. 4 illustrates a flow chart of an example method 400 for instantiating workflow instances. Method 400 will be described with respect to the components and data of computer architecture 300.

Consumer 302 can send command 319 to workflow instantiation module 303. Command 319 can be a command requesting a workflow instance.

Consumer property 325 can be formulated by or otherwise associated with consumer 302 (i.e., property 325 can be a "consumer") property. Consumer property 325 can be used to instantiate the variable functionality. In one aspect, consumer property 325 is accessible without restriction. In another aspect, consumer property 325 is accessible using credentials of consumer 302. The credentials can be included in connection 324. Connection 324 obscures the credentials of consumer 302 and limits use of the credentials to workflows instances created from workflow template 311.

Method 400 includes receiving a command to execute an instance of a workflow (401). For example, workflow instantiation module 303 can receive command 319 from consumer 302.

Method 400 includes accessing a workflow template defining fixed functionality and variable functionality that is customizable (402). For example, workflow instantiation module 303 can access workflow template 311. As described, workflow template 311 includes fixed functionality definition 313 and variable functionality definition 314. Fixed functionality definition 313 defines functionality that is virtually the same for any workflow instance created from workflow template 311, including update functionality defined in update functionality definition 321. Variable functionality definition 314 defines variable functionality that can be customized differently between different workflow instances created from workflow template 311.

Method 400 includes accessing a first property (403). For example, workflow instantiation module 303 can access author property 323. When appropriate, workflow instantiation module 303 can utilize credentials in author property 323 and/or in connection 322 to access a resource. Method 400 includes accessing a second property (404). For example, workflow instantiation module 303 can access consumer property 325. When appropriate, workflow instantiation module 303 can utilize credentials in connection 324 and/or consumer property 325 to access a consumer resource associated with consumer 302.

Method 400 includes creating a workflow instance from the workflow template (405). For example, workflow instantiation module 303 can create workflow instance 304 (e.g., in system memory) from workflow template 311.

Method 400 includes instantiating the fixed functionality in the workflow instance based on the first property (406). For example, in one aspect, workflow instantiation module 303 can instantiate fixed functionality 327, including update functionality 328, in workflow instance 304 based on author property 323. In another aspect, credentials in author property 323 and/or connection 322 are used to access a resource associated with workflow author 301. In this alternative aspect, workflow instantiation module 303 can instantiate fixed functionality 327, including update functionality 328, in workflow instance 304 based on the accessed resource. For either aspect, workflow instantiation module 303 can instantiate fixed functionality 327 from fixed functionality definition 313. More specifically, workflow instantiation module 303 can instantiate update functionality 328 from update functionality definition 321.

Method 400 includes customizing instantiation of the variable functionality in the workflow instance based on the second property (407). For example, workflow instantiation module 303 instantiate customized variable functionality 326 in workflow instance 304 based on property 325.

After workflow instance 304 is instantiated, consumer 302 can exchange usage activity 318 with (e.g., input to and/or output from) workflow instance 304 to perform a specified function (e.g., multiple numbers, access a message, view a file share, etc.). Also after workflow 304 is instantiated, workflow author 301 can send update 317 to update functionality 328 to change how workflow instance 304 functions. As such, the functionality of workflow instance 304 can be changed without having to re-create workflow instance 304.

Method 400 can also be implemented for other consumers. For example, consumer 342 can send command 359 to workflow instantiation module 303. Command 359 can be a command creation of an instance of a workflow.

Property 328 can be formulated by and/or otherwise associated with consumer 342 (i.e., property 328 is a "consumer" property). Property 328 can differ from property 325. Property 328 can be used to customize instantiation of variable functionality in a different way than property 325. In one aspect, property 328 accessible without restriction. In another aspect, property 328 is accessible using credentials of consumer 342. The credentials can be included in connection 363. Connection 363 obscures the credentials of consumer 342 and limits use of the credentials to workflow instances created from workflow template 311.

Workflow instantiation module 303 can receive command 359 from consumer 302. Workflow instantiation module 503 can access workflow template 311. Workflow instantiation module 303 can access author property 323. When appropriate, workflow instantiation module 303 can utilize credentials in author property 323 and/or connection 322 to access a resource associated with workflow author 310. Workflow instantiation module 303 can access property 328. When appropriate, workflow instantiation module 303 can utilize credentials in connection 363 to access property 328. Workflow instantiation module 303 can create workflow instance 344 (e.g., in system memory) from workflow template 311.

Workflow instantiation module 303 can instantiate fixed functionality 327, including update functionality 328, in workflow instance 344 using any of the mechanisms described with respect to act 406 of method 400. Workflow instantiation module 303 can instantiate fixed functionality 327 from fixed functionality definition 313. More specifically, workflow instantiation module 303 can instantiate update functionality 328 from update functionality definition 321. Workflow instantiation module 303 can instantiate customized variable functionality 366 in workflow instance 344 based on property 328. Customized variable functionality 366 can differ from customized variable functionality 326 (e.g., based on the functionality desired by consumers 342 and 302 respectively).

After workflow instance 344 is created, consumer 342 can exchange usage activity 358 with (e.g., input to and/or output from) workflow instance 344 to perform a specified function (e.g., multiple numbers, access file, receive a notification, etc.). Also after workflow 344 is created, workflow author 301 can send update 317 to update functionality 321 to change how workflow instance 344 functions. As such, the functionality of workflow instance 344 can be changed without having to re-create workflow instance 344.

Workflow Instantiation for Collaborating Co-Authors

Figure 5:
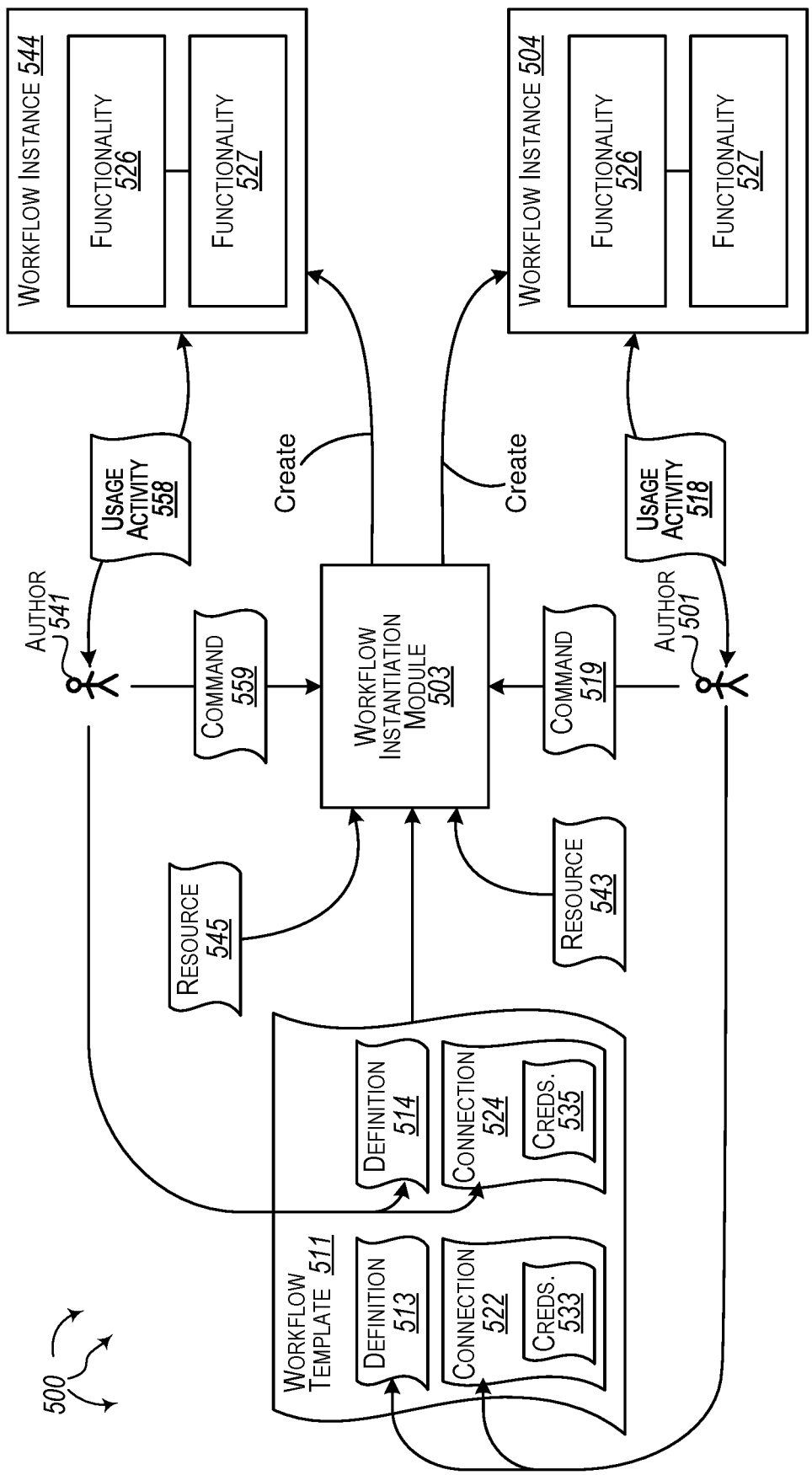
FIG. 5 illustrates an example computer architecture that facilitates instantiating a workflow instance for a co-author of a workflow template.

FIG. 5 illustrates an example computer architecture 500 that facilitates instantiating a workflow instance for a co-author of a workflow template. As depicted, computer architecture 500 includes authors 501 and 541, workflow instantiation module 503, workflow instance 504, and instance workflow 544. Authors 501 and 541, workflow instantiation module 503, workflow instance 504, and workflow instance 544 can be connected to (or be part of) a network, such as, for example, a system bus, a Local Area Network ("LAN"), a Wide Area Network ("WAN"), and even the Internet. Accordingly, authors 501 and 541, workflow instantiation module 503, workflow instance 504, and workflow instance 544 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, authors 501 and 541 (e.g., different people) can collaborate as co-authors to create workflow template 511. Author 501 can author functionality definition 513 and author 541 can author functionality definition 514.

Author 501 can formulate or otherwise be associated with resource 543. Resource 543 can be used to instantiate functionality defined in functionality definition 513. In one aspect, resource 543 is accessible without restriction. In another aspect, resource 543 is accessible using credentials 533 of author 501. Author 501 can include connection 522 in workflow template 511. Credentials 533 can be included in connection 522. Connection 522 obscures the credentials 533 and limits use of credentials 533 to workflows instantiated from workflow template 511.

Similarly, author 541 can formulate or otherwise be associated with resource 545. Resource 545 can be used to instantiate functionality defined in functionality definition 514. In one aspect, resource 545 is accessible without restriction. In another aspect, resource 545 is accessible using credentials 535 of author 541. Author 541 can include connection 524 in workflow template 511. Credentials 535 can be included in connection 524. Connection 524 obscures credentials 535 and limits use of credentials 535 to workflows instantiated from workflow template 511.

Workflow instantiation module 503 is configured to access workflow template 511, resource 543, and resource 545. Workflow instantiation module 503 can create a workflow instance (e.g., in system memory) from workflow template 511. Workflow instantiation module 503 can use resource 543 to instantiate functionality corresponding to functionality definition 513 in the workflow instance. Similarly, workflow instantiation module 503 can use resource 545 to instantiate functionality corresponding to functionality definition 513 in the workflow instance.

Authors 501 and 541 can interact with workflows through usage activity, such as, for example, entering input into workflow and receiving output from the workflow.

Figure 6:
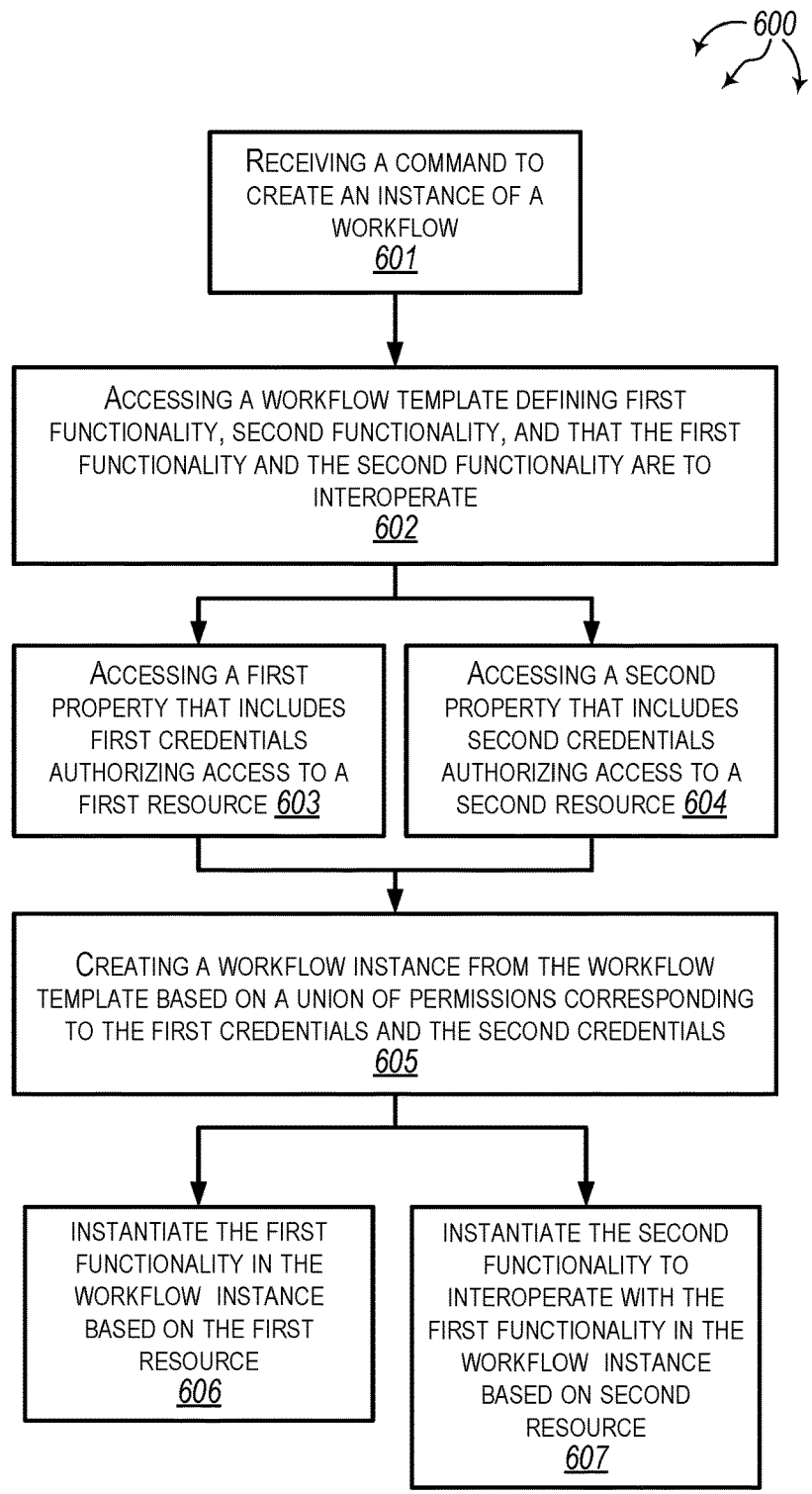
FIG. 6 illustrates a flow chart of an example method for instantiating a workflow instance for a co-author of a workflow template.

FIG. 6 illustrates a flow chart of an example method 600 for instantiating a workflow instance for a co-author of a workflow template. Method 600 will be described with respect to the components and data of computer architecture 500.

Author 501 can send command 519 to workflow instantiation module 503. Command 519 can be a command requesting creation of a workflow instance. Method 600 includes receiving a command to create an instance of a workflow (601). For example, workflow instantiation module 503 can receive command 519 from author 501.

Method 600 includes accessing a defining first functionality, second functionality, and that the first functionality and the second functionality are to interoperate (602). The workflow template can be co-authored by a first co-author and a second co-author. For example, workflow instantiation module 503 can access workflow template 511. As described, workflow template 511 includes functionality definition 513 (authored by author 501) and functionality definition 514 (authored by author 541). Workflow template 511 can further define that functionality instantiated from functionality definitions 513 and 514 is to interoperate in created workflow instances.

Method 600 includes accessing a first property that includes first credentials authorizing access to a first resource (603). For example, workflow instantiation module 503 can access connection 522 that includes credentials 533. Workflow instantiation module 503 can utilize credentials 533 to access resource 543. Method 600 includes accessing a second property that includes second credentials authorizing access to a second resource (604). For example, workflow instantiation module 503 can access connection 524 that includes credentials 535. Workflow instantiation module 503 can utilize credentials 535 to access resource 545.

Method 600 includes creating a workflow instance from the workflow template based on a union of permissions corresponding to the first credentials and second credentials (605). For example, workflow instantiation module 503 can create workflow instance 504 (e.g., in system memory). Workflow instance 504 can operate with permissions that are the union of permissions corresponding to credentials 533 (author 501) and credentials 535 (author 541). Using the union of permissions permits workflow instance 504 to access resource 543 (and possibly other resources associated with author 501) and to access resource 545 (and possibly other resources associated with author 541). Resource 545 can be accessed based on the union of permissions even though author 501 may not otherwise have permission to access resource 545. Accessed resources associated with authors 501 and 541 can be used together (e.g., combined, integrated, etc.) within the workflow instance 504 to perform activities defined in workflow template 511.

Method 600 includes instantiating the first functionality in the workflow instance based on the first resource (606). For example, workflow instantiation module 503 can instantiate functionality 526 (from functionality definition 513) in workflow instance 504 based on resource 543. Method 600 includes instantiating the second functionality in the workflow instance based on the second resource (607). For example, workflow instantiation module 503 can instantiate functionality 527 (e.g., from functionality definition 514) in workflow instance 504 based on resource 545. Functionalities 526 and 527 can interoperate to provide overall workflow functionality of workflow instance 504.

After workflow instance 504 is created, author 501 can exchange usage activity 518 with (e.g., input to and/or output from) workflow instance 504 to perform a specified function (e.g., multiple numbers, check e-mail, receive a notification, etc.).

Method 600 can also be implemented for author 541. Author 541 can send command 549 to workflow instantiation module 503. Command 549 can be a command requesting creation of a workflow instance. Workflow instantiation module 503 can receive command 549 from author 541. Workflow instantiation module 503 can access workflow template 511.

Workflow instantiation module 503 can access connection 522. Workflow instantiation module 503 can utilize credentials 533 to access resource 543. Workflow instantiation module 503 can access connection 524. Workflow instantiation module 503 can utilize credentials 535 access resource 545.

Workflow instantiation module 503 can create workflow instance 544 (e.g., in system memory). Workflow instance 544 can operate with permissions that are the union of permissions corresponding to credentials 533 (author 501) and credentials 535 (author 541). Using the union of permissions permits workflow instance 544 to access resource 543 (and possibly other resources associated with author 501) and to access resource 545 (and possibly other resources associated with author 541). Resource 543 can be accessed based on the union of permissions even though author 541 may not otherwise have permission to access resource 543. Accessed resources associated with authors 501 and 541 can be used together (e.g., combined, integrated, etc.) within the workflow instance 544 to perform activities defined in workflow template 511.

Workflow instantiation module 503 can instantiate functionality 526 (from functionality definition 513) in workflow instance 544 based on resource 543. Workflow instantiation module 503 can instantiate functionality 527 (e.g., from functionality definition 514) in workflow instance 544 based on resource 545.

After workflow instance 544 is instantiated, author 541 can exchange usage activity 558 with (e.g., input to and/or output from) workflow instance 544 to perform a specified function (e.g., multiple numbers, access a file share, update a status, etc.).

Accordingly, authors 501 and 541 can utilize each other's credentials through workflow instances without having to share credentials. Each of authors 501 and 541 can create a workflow instance that utilizes combined permissions corresponding to credentials 533 and 535.

Managed Workflows

A managed workflow template can include a partially or fully formed flow definition and zero or more connections. Managed workflows allow workflow template authors to control workflow instances that are created from their templates.

For Managed Flows:

Let x, be the set of inputs provided by the maker, and y be the set of inputs required to complete the flow definition. Hence, the total set of inputs is required is: x U y Then:

The set x would be a singleton—defined by the Maker for and apply to all managed flows.

The set y would exist per flow instantiated from the managed flow template.

The values in set y can be different per instance of managed flow

The values in set x will be constant for every instance of the managed flow.

Model Similarly: Let x, be the set of connections provided by the maker, and y be the set of connections required to complete the flow. Hence, the set of connections required to enable the flow is: x U y Then:

The set x would be a singleton—defined by the Maker for and apply to all managed flows.

The set y would exist per flow instantiated from the managed flow template.

The connections in set y can be different per instance of managed flow

The connections in set x will be constant for every instance of the managed flow.

Accordingly, in some aspects, workflow inputs are included a consumer context.

Figure 7A:
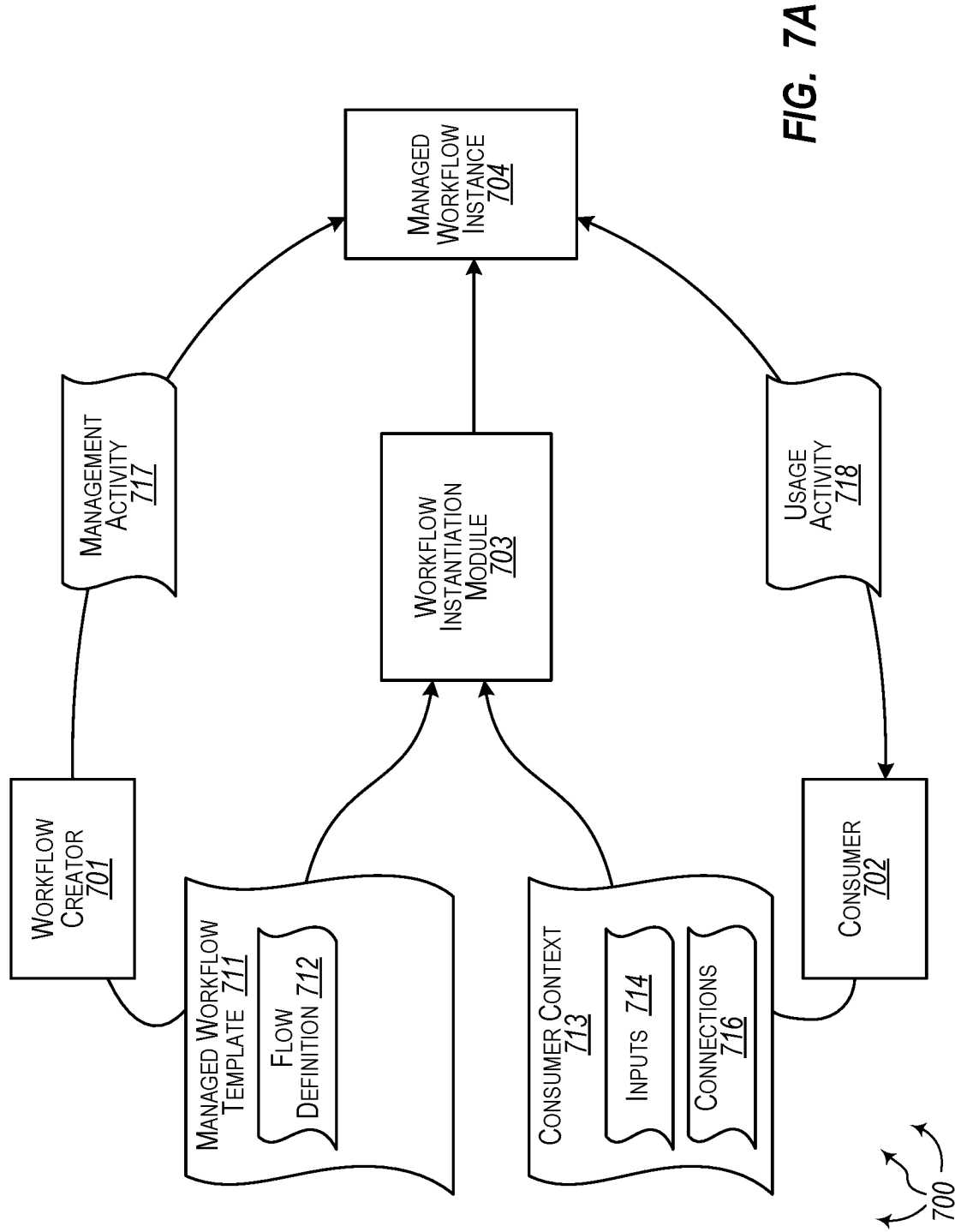
FIG. 7A illustrates an example computer architecture that facilitates instantiating a workflow instance from inputs contained in a consumer context.

FIG. 7A illustrates an example computer architecture 700 that facilitates instantiating a workflow instance from inputs contained in a consumer context. Computer architecture 700 includes workflow creator 701 (e.g., a human author), consumer 702, and workflow execution module 703. Workflow creator 701 can create managed workflow template 711 including flow definition 712. In general, managed workflow template 711 provides a scaffolding that one or more consumers can use to create a managed workflow. Flow definition 712 can be a partially or fully formed flow definition. Flow definition 712 can be a (possibly fully formed) schema that defines a workflow and may contain some or all inputs appropriate to create a workflow instance.

Consumer 702 may desire to run a managed workflow instance based on managed workflow template 711. Consumer 702 can instruct workflow instantiation module 703 (e.g., running "in the cloud") to access managed workflow template 711. Consumer 702 can also enter consumer context 713, including inputs 714 (e.g., properties) and connections 716, to workflow instantiation module 703. Alternately, if consumer 702 has previously entered inputs 714 and connections 716, consumer 702 can instruct workflow instantiation module 703 to access inputs 714 and connections 716 from a storage location.

Inputs 714 can include data associated with consumer 702 and relevant to running a managed workflow instance to perform activities for consumer 702 (e.g., sharepoint lists, directory locations, etc.). Connections 716 can hold credentials for consumer 702 that enable running a workflow instance with corresponding permissions of consumer 702. Consumer 702 can enter credentials to workflow instantiation module 703. Workflow instantiation module 703 can form connections 716 from the credentials.

In one aspect, consumer 702 enters credentials into workflow instantiation module 703 (e.g., through a user interface) and workflow instantiation module 703 creates connections 716.

Workflow instantiation module 703 can create managed workflow instance 704 based on managed workflow template 711 and consumer context 713. After creation, consumer 703 can exchange usage activity 718 (e.g., submitting input, receiving notifications, etc.) with managed workflow instance 704. Also after creation, workflow creator 701 can take various management activity 717 (e.g., update, versioning, block consumers from using, etc.) with respect to managed workflow instance 704.

Context 713 can have permissions limited to those assigned to consumer 702. As such, consumer 702 is essentially prevented from using managed workflow instance 704 for malicious activities. For example, even if consumer 702 were to modify managed workflow instance 704 to access another user's files, accessing the other users' files would likely fail since consumer 702 lacks appropriate permissions.

Figure 7B:
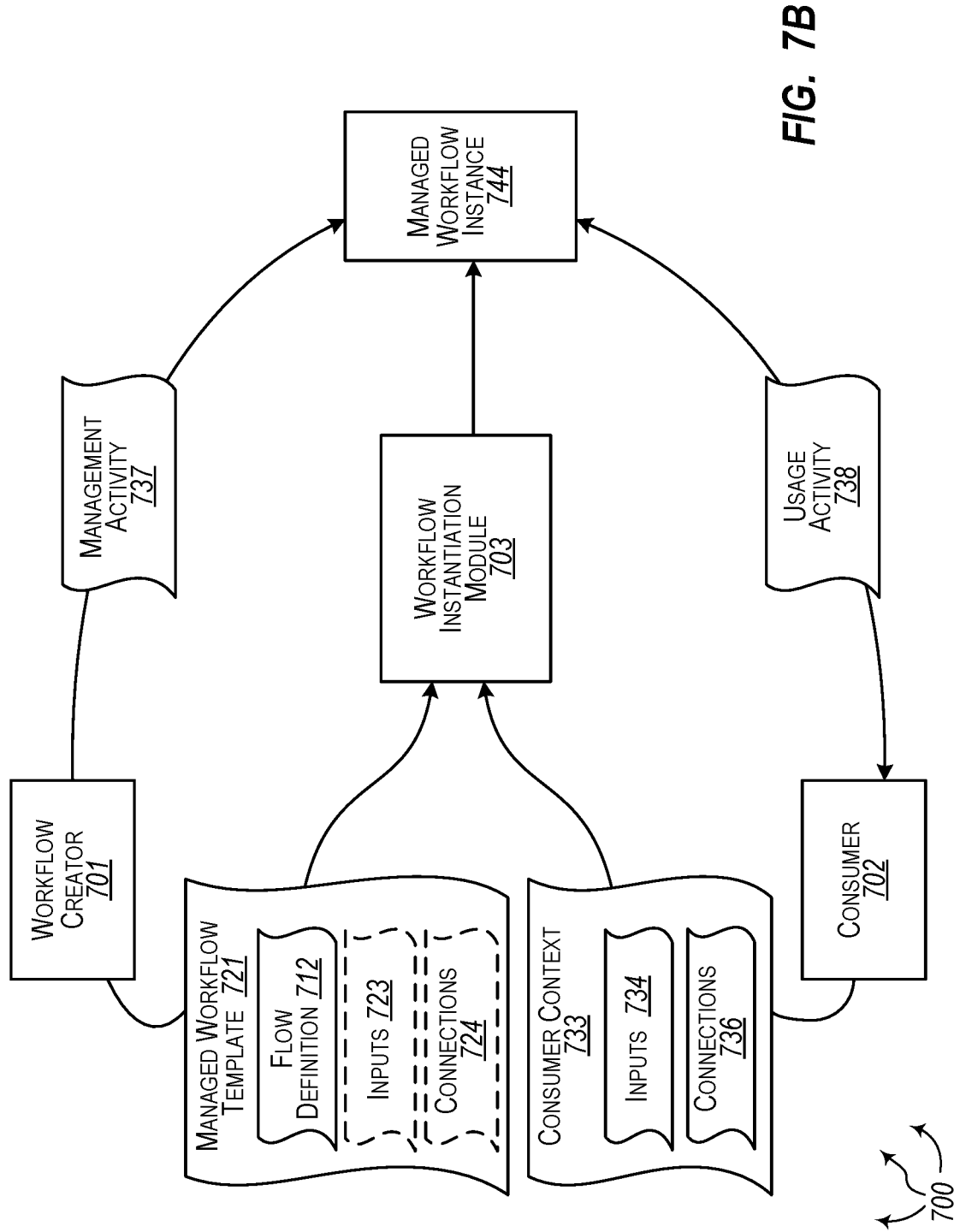
FIG. 7B illustrates an example computer architecture that facilitates instantiating a workflow instance from inputs contained in a consumer context and inputs contained in a workflow template.

FIG. 7B illustrates computer architecture 700 that facilitates instantiating a workflow from inputs contained in a consumer context and inputs contained in a workflow template. In FIG. 7B, workflow creator 701 creates managed workflow template 721 including flow definition 722, inputs 723, and connections 724. Inputs 723 and connections 724 can provide access to common resources utilized by the defined workflow independent of consumer. For example, workflow creator 701 may desire to log errors from executed workflows to a SQL database. Inputs 723 can identify the SQL database and connections 724 can include credentials for accessing the SQL database.

Consumer 702 may desire to create a managed workflow instance based on managed workflow template 721. Consumer 702 can instruct workflow instantiation module 703 to access managed workflow template 721. Consumer 702 can also enter consumer context 713, including inputs 714 and connections 716, to workflow execution module 703. Alternately, if consumer 702 has previously entered inputs 714 and connections 716, consumer 702 can instruct workflow instantiation module 703 to access inputs 714 and connections 716 from a storage location.

Workflow instantiation module 703 can create managed workflow instance 744 based on managed workflow template 741 and consumer context 713. After creation, consumer 703 can exchange usage activity 738 (e.g., submitting input, receiving notifications, etc.) with managed workflow 744. Also after instantiation, workflow creator 701 can take various management activity 737 (e.g., update, versioning, block consumers from using, etc.) with respect to managed workflow instance 744.

Managed workflow 744 can perform activities using permissions for both workflow creator 701 (e.g., to log errors) and consumer 702 (e.g., to perform consumer activities defined in flow definition 712). Since workflow creator 701 and consumer 702 both have limited permissions (e.g., relative to a super user, administrator, etc.), attempted malicious activity initiated through managed workflow instance 744 can be substantially reduced, if not all together eliminated.

Managed workflow instance 744 operates in consumer context 733 as well as context defined by inputs 723 and connections 724. However, consumer 702 cannot use connections 724 to perform activities based on workflow creator 701's permissions outside of managed workflow instance 744. Similarly, workflow creator 701 cannot use connections 736 to perform activities based on consumer 702's permissions outside of managed workflow instance 744. In one aspect, inputs 723 and connections 724 can be used by workflow instantiation module 703 but are otherwise protected and/or not visible. As such, consumer 702 may be unaware that inputs 723 and connections 724 are even included in managed workflow template 721.

Multi-Consumer Managed Workflows

Figure 8:
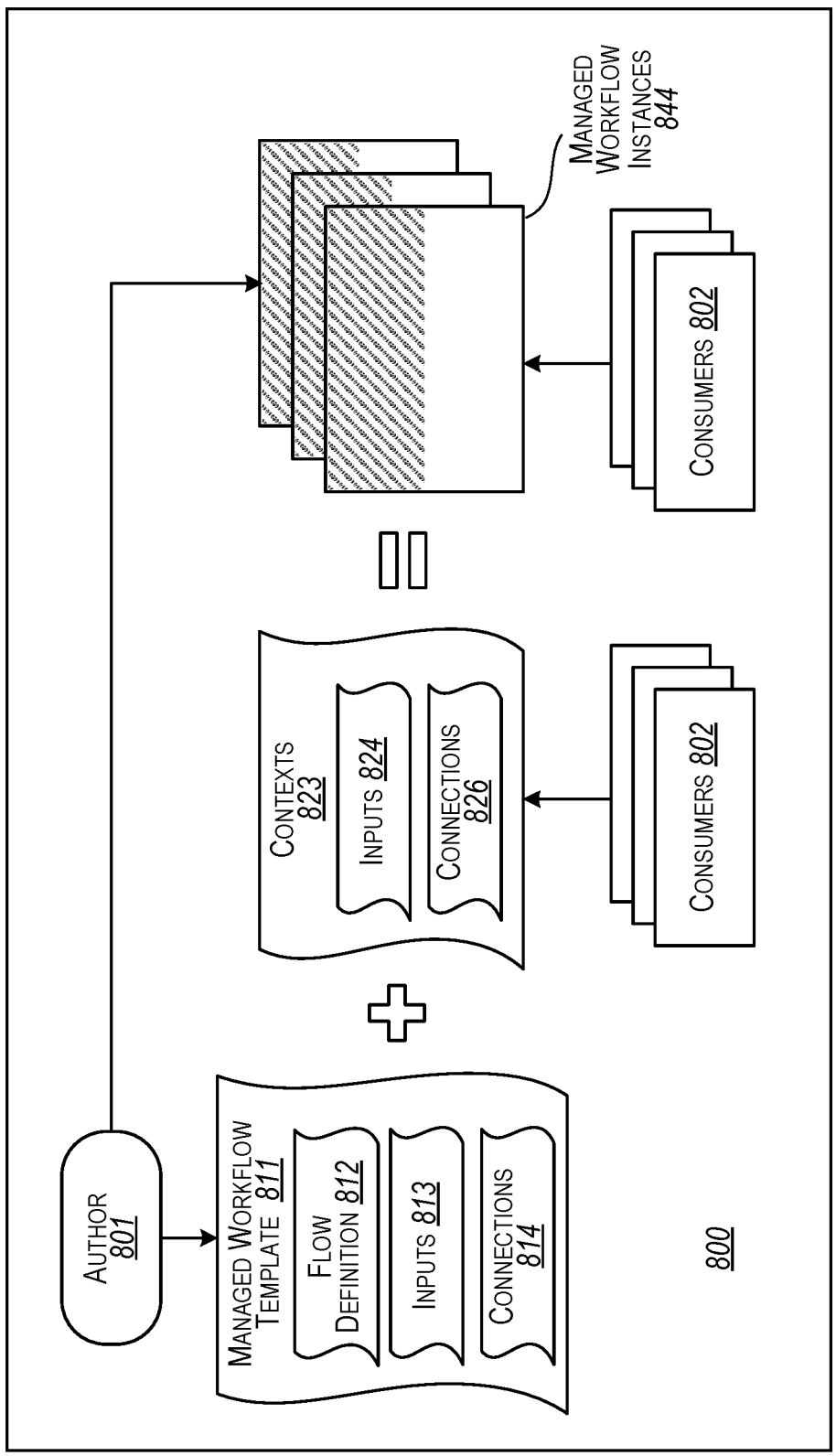
FIG. 8 illustrates a computer architecture that facilitates running multi-consumer managed workflow instances.

Managed workflow instances can be used by multiple different consumers within their own contexts. FIG. 8 illustrates a computer architecture 800 that facilitates running multi-consumer managed workflow instances. Author 801 can create managed flow template 811 including flow definition 812, input 813, and connections 814. Each of consumers 802 can enter a context 823 including their inputs 824 and connections 826. Managed flow template 811 can be combined with contexts 823 to execute managed flows instances 844 for consumers 802. Each one of managed workflow instances 844 can correspond to a specific consumer 802 and operate in a context 823 corresponding to that specific consumer 802. Author 801 can manage managed workflow instances 844 (as indicated by the hatched portions of managed workflow instances 844).

Team Workflows

In some aspects, a plurality of workflow authors collaborate to create a workflow definition. Each of the plurality of creators provides connections and inputs to define one or more portions of functionality in workflow template. Workflow instances created form the workflow template perform activities with permissions equivalent to the union of the permissions of the plurality of workflow authors. Each of the plurality of workflow authors can create workflow instances from the workflow template w. However, since user credentials are included in connections, authors do not have direct access to one another's credentials. Further, authors cannot user another author's connections outside of the workflow.

Figure 9B:
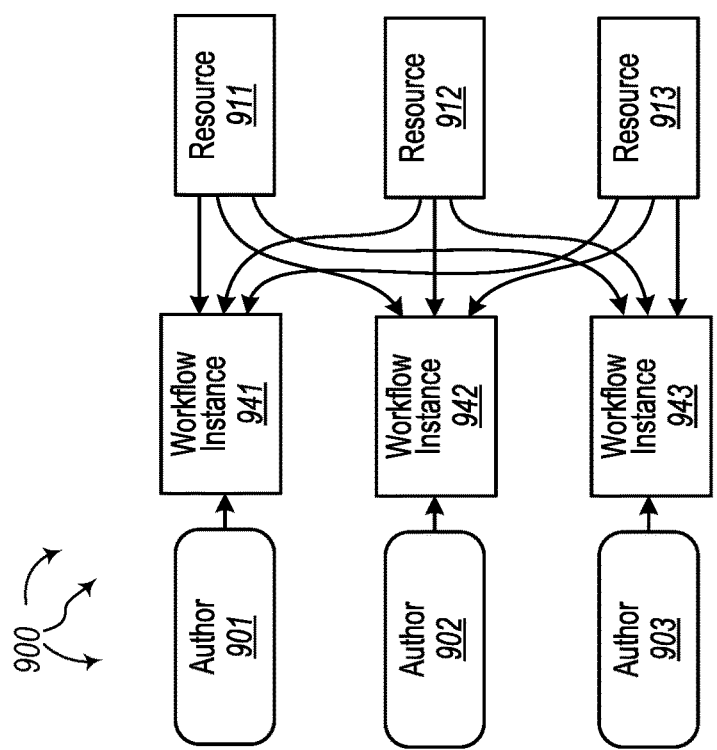
FIGS. 9A and 9B illustrates an example computer architecture that facilitates creating and instantiating team based workflow instances.
Figure 9A:
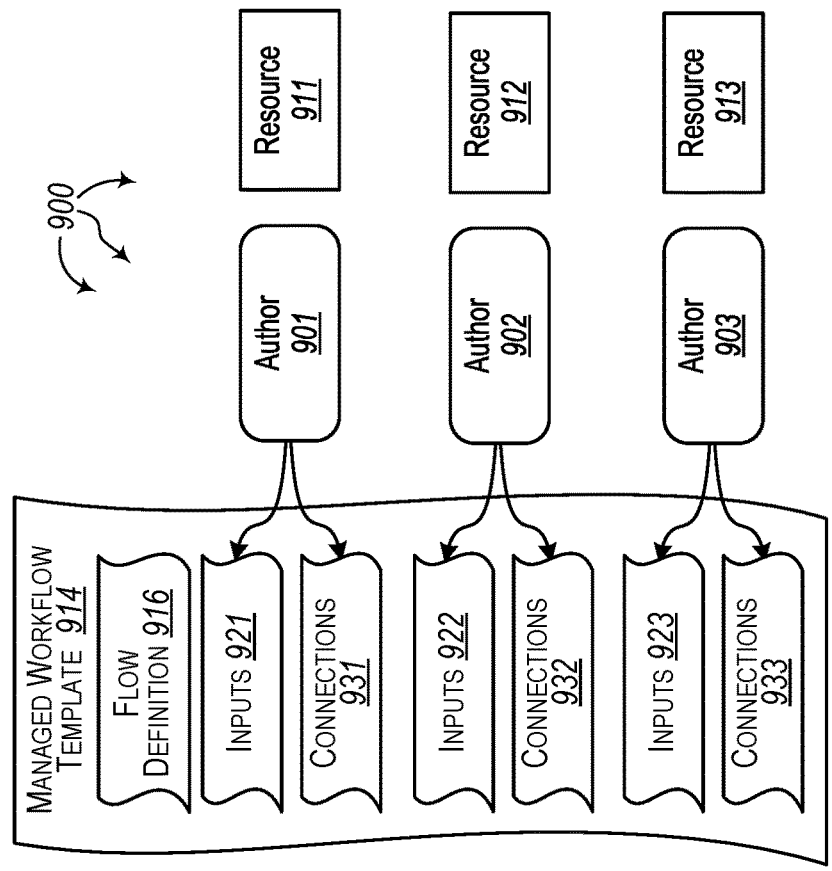

FIGS. 9A and 9B illustrates an example computer architecture 900 that facilitates creating and instantiating team based workflow instances. In FIG. 9A, authors 901, 902, and 903 can have permissions to access resources 911, 912, and 913 respectively. Authors 901, 902, and 903 can collaborate to create managed workflow definition 914, including flow definition 916.

Each of authors 901, 902, and 903 can include inputs and/or connections relevant to accessing corresponding resources. For example, author 901 can include inputs 921 and connections 931 for accessing resource 911. Similarly, author 902 can include inputs 922 and connections 932 for accessing resource 912. Likewise, author 903 can include inputs 923 and connections 933 for accessing resource 913.

As such, any managed workflow instances created from managed workflow template 914 can perform activities with the combined permissions of authors 901, 902, and 903 permitting access to resources 911, 912, and 913. Turning to FIG. 9B, author 901 can instantiate workflow instance 941 based on managed workflow template 914. Similarly, author 902 can instantiate workflow instance 942 based on managed workflow template 914. Likewise, author 903 can instantiate workflow instance 943 based on managed workflow template 914. Each of workflows 941, 942, and 943 have access to inputs 921, 922, and 923 and to connections 931, 932, and 933. As such, each of workflows 941, 942, and 943 are permitted to access each of resources 911, 912, and 913.

Dynamic Execution of Managed Workflows

In some aspects, a watcher (e.g., a workflow engine) dynamically invokes managed workflow instances on behalf of a user. The watcher can watch for a trigger event (e.g., an event, such as, addition of a file to a directory) relevant to a user. Trigger events can be detected in different ways including polling triggers and listening. Listening may utilize Webhook based triggers. When a trigger is detected and in response to the detected trigger, the watcher can create a managed workflow instance in the context of the user. Users can provide connection and input to the workflow engine (e.g., through a user interface).

Figure 10:
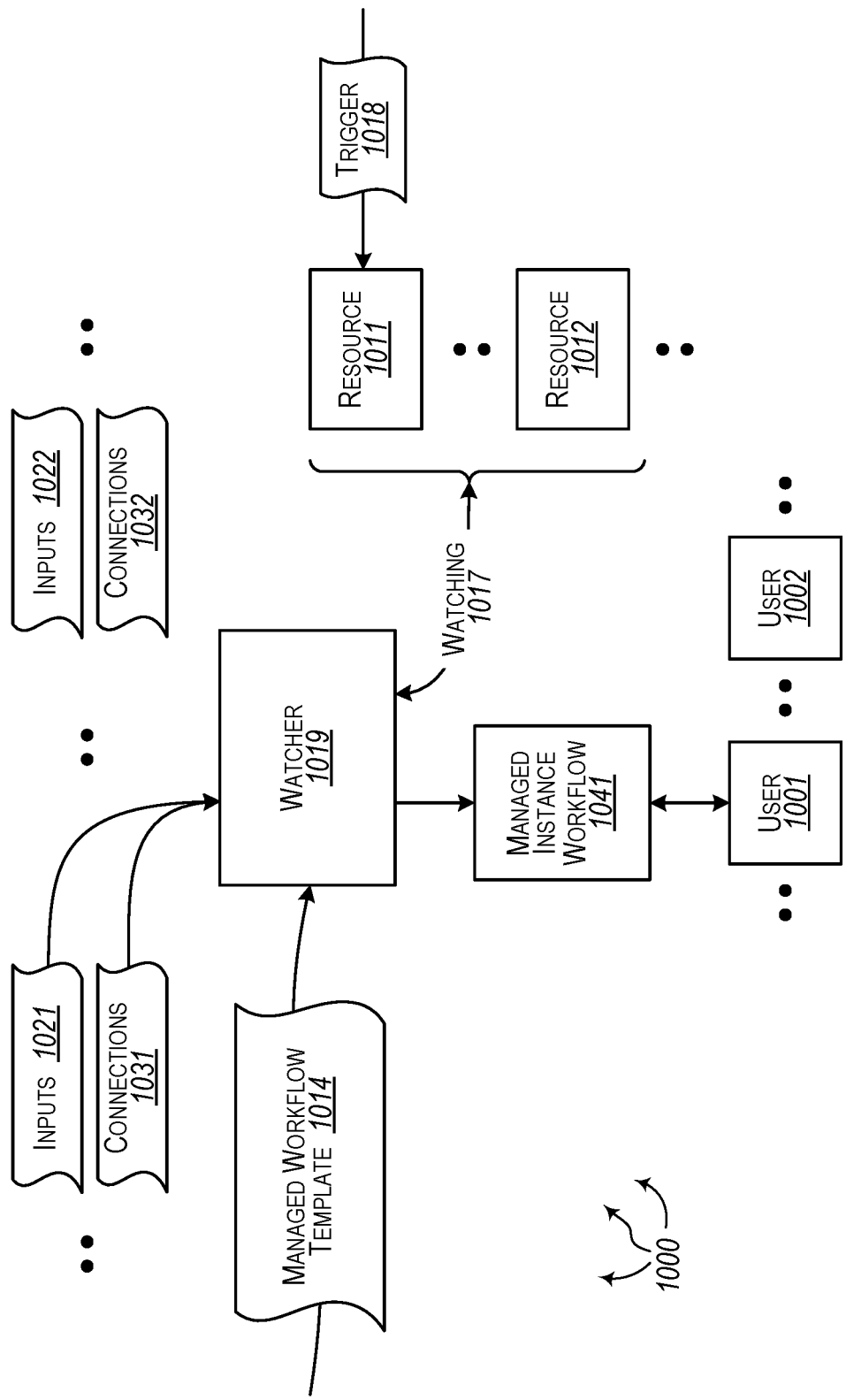
FIG. 10 illustrates an example computer architecture that facilitates dynamic execution of managed workflow instances.

FIG. 10 illustrates an example computer architecture 1000 that facilitates dynamic execution of managed workflow instances. Watcher 1019 (e.g., a workflow engine) can watch 1017 resources 1011, 1012, etc., on behalf of users 1001, 1002, etc. respectively. For example, watcher 1019 can be watching 1017 resource 1011 for user 1001. Users may have previously submitted inputs and connections to workflow engine 1019. For example, user 1001 can submit inputs 1021 and connections 1031, user 1002 can submit inputs 1022 and connections 1032, etc.

Watcher 1019 can detect trigger 1018 at resource 1011 (e.g., a change in a list, addition of a file, etc.). In response, watcher 1019 can access managed workflow template 1014, inputs 1021, and connections 1031. Watcher 1019 can include a workflow instantiation module (e.g., similar to any of workflow instantiation modules 103, 303, 503, or 703). Based on managed workflow template 1014, inputs 1021, and connections 1031, workflow engine 1019 can create managed workflow instance 1041 in the context of user 1001. User 1001 can then participate in various user activities with managed workflow 1041.

The various components depicted in described computer architectures 700, 800, 900 and 1000 can be connected to (or be part of) a network, such as, for example, a system bus, a Local Area Network ("LAN"), a Wide Area Network ("WAN"), and even the Internet. Accordingly, the various components as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Accordingly, aspects of the invention permit one entity to instantiate a workflow that is managed by another entity. Further a workflow definition can be used by many users to create many corresponding workflow instances. Users can run workflow instances in their own context without having to construct a workflow definition. Created workflows can receive updates from a workflow definition author. Connections of authors and/or consumers can be mixed and matched to provide appropriate access to resources.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: workflow templates, functionality definitions, properties, author properties, consumer properties, resources, permissions, unions of permissions, credentials, management activities, commands, usage activities, update functionality, workflow functionality, fixed functionality, variable functionality, updates, inputs, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, workflow templates, functionality definitions, properties, author properties, consumer properties, resources, permissions, unions of permissions, credentials, management activities, commands, usage activities, update functionality, workflow functionality, fixed functionality, variable functionality, updates, inputs, etc.

Various described aspects of the invention can also be combined in additional and different ways. For example, multiple authors can co-author a workflow template that is then made available to consumers. The workflow template can define fixed as well as variable (and customizable) workflow functionality. Other combinations are also contemplated.

In some aspects, a computer system comprises one or more hardware processors and system memory. The one or more hardware processors execute instructions stored in the system memory to automatically perform any of the described functionality. In other aspects, computer implemented methods can be used to perform any of the described functionality. In further aspects, computer program products include computer-executable instructions, that when executed at a processor, cause a computer system to perform any of the described functionality.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system, the computer system comprising:
a processor;
system memory coupled to the processor and storing instructions configured to cause the processor to:
receive a command to create an instance of a workflow;
access a workflow template defining:
fixed functionality; and
variable functionality that is customizable;
access a first property that includes credentials authorizing access to a resource used by the fixed functionality, via a first stored encrypted data element that obscures the credentials and limits use of the credentials to workflows instantiated from the workflow template;
access a second property;
create a workflow instance from the workflow template;
instantiate the fixed functionality in the workflow instance based on the resource; and
customize instantiation of the variable functionality in the workflow instance based on the second property.

2. The system of claim 1, wherein the fixed functionality comprises workflow update functionality to update workflows instantiated from the workflow template; and
wherein the instructions configured to instantiate the fixed functionality comprise instructions configured to instantiate the workflow update functionality.

3. The system of claim 1, wherein the instructions configured to access a first property comprise instructions configured to access the first stored encrypted data element that includes author credentials for an author of the workflow template.

4. The system of claim 3, further comprising instructions configured to use the author credentials to access the first resource.

5. The system of claim 1, wherein the instructions configured to access a second property comprise instructions configured to access a second stored encrypted data element that includes consumer credentials for a consumer of the workflow template and that authorizes access to a consumer resource used to customize the customizable functionality.

6. The system of claim 5, further comprising instructions configured to use the consumer credentials to access the second resource.

7. The system of claim 1, further comprising instructions configured to:
receive a second command to create an instance of the workflow;
access the first property again;
access a third property;
create a second workflow instances from the workflow template;
instantiate the fixed functionality in the second workflow instance based on the resource; and customize instantiation of the variable functionality in the workflow instance based on the property, customization of the second workflow instance differing from customization of the workflow instance.

8. The system of claim 7, further comprising instructions configured to:
send an update to the workflow instance to update at least one of: the fixed functionality at the workflow instance or the variable functionality at the workflow instance; and
send the update to the second workflow instance to update at least one of: the fixed functionality at the second workflow instance or the variable functionality at the second workflow instance.

9. The computer system of claim 1, wherein the workflow template defines that the first functionality and the second functionality are to interoperate in workflow instances created from the workflow template; and
wherein the instructions configured to customize instantiation of the variable functionality comprise instructions configured to instantiate the second functionality to interoperate with the first functionality in the workflow instance.

10. A computer system, the computer system comprising:
a processor;
system memory coupled to the processor and storing instructions configured to cause the processor to:
receive a command to create an instance of a workflow;
access a workflow template defining:
first functionality and,
second functionality,
wherein the first functionality and the second functionality are configured to interoperate;
access a first property that includes first credentials authorizing access to a first resource, via a first stored encrypted data element that obscures the first credentials and limits use of the first credentials to workflows instantiated from the workflow template;
access a second property that includes second credentials authorizing access to a second resource;
create a workflow instance from the workflow template based on a union of permissions corresponding to the first credentials and second credentials;
instantiate the first functionality in the workflow instance based on the first resource; and
instantiate the second functionality to interoperate with the first functionality in the workflow instance based on the second resource.

11. The system of claim 10, wherein the instructions configured to access a first property comprise instructions configured to access the first stored encrypted data element that includes the first credentials for a first co-author of the workflow template; and
wherein the instructions configured to access a second property comprise instructions configured to access a second stored encrypted data element that includes the second credentials for a second co-author of the workflow template.

12. The system of claim 11, further comprising instructions configured to use the first stored encrypted data element to access the first resource; and
further comprising instructions configured to use the second stored encrypted data element to access the second resource.

13. The system of claim 11, wherein the instructions configured to receive a command to create an instance of a workflow comprise instructions configured receive a command associated with the first co-author.

14. The system of claim 13, further comprising instructions configured to:
receive a second command to create a workflow instance associated with the second co-author;
create a second workflow instance from the workflow template based on the union of permissions corresponding to the first credentials and second credentials;
instantiate the first functionality in a second workflow instance based on the first resource; and
instantiate the second functionality to interoperate with the first functionality in the second workflow instance based on the second property.

15. A method comprising:
receiving a command to create an instance of a workflow;
accessing a workflow template defining:
first functionality comprising fixed functionality,
second functionality comprising variable functionality that is customizable, and
that the first functionality and the second functionality are to interoperate in workflow instances created from the workflow template;
accessing a first property, that includes credentials authorizing access to a resource, via a first stored encrypted data element that includes author credentials for an author of the workflow template;
accessing a second property comprising accessing a consumer property;
creating a workflow instance from the workflow template;
instantiating the first functionality in the workflow instance based on the resource; and
instantiating the second functionality, comprising customizing the variable functionality in the workflow based on a consumer resource, to interoperate with the first functionality in the workflow instance based on the second property.

16. The method of claim 15, wherein the first stored encrypted data element that includes the author credentials, obscures the author credentials, and limits use of the author credentials to workflows instantiated from the workflow template.

17. The method of claim 15, wherein the fixed functionality comprises workflow update functionality to update workflow instances created from the workflow template; and
wherein instantiating the first functionality comprises instantiating the workflow update functionality in the workflow instance.

18. The method of claim 17, further comprising:
receiving second command to create an instance of the workflow;
accessing a third property;
creating a second workflow instance from the workflow template;
instantiating the fixed functionality in a second workflow instance based on the resource; and
customizing the variable functionality in the second workflow instance based on the third property.

19. The method of claim 18, further comprising:
sending an update to the workflow instance to update at least one of: the fixed functionality at the workflow instance or the variable functionality at the workflow instance; and
sending another update to the second workflow instance to update the second workflow instance in the manner the workflow instance is to be updated.

20. The method of claim 15, wherein accessing a second property comprises accessing a second stored encrypted data element that includes consumer credentials, obscures the consumer credentials, and limits use of the consumer credentials to workflows instantiated from the workflow template.

\* \* \* \* \*